(12) United States Patent
Lavi

(10) Patent No.: US 11,924,654 B2
(45) Date of Patent: Mar. 5, 2024

(54) METHODS AND SYSTEMS FOR SUPPORTING COMMUNICATION A PLURALITY OF CLIENT COMMUNICATION DEVICES IN A WIRELESS LOCAL AREA NETWORK

(71) Applicant: Gabriel Lavi, Raanana (IL)

(72) Inventor: Gabriel Lavi, Raanana (IL)

(*) Notice: Subject to any disclaimer, the term of this patent is extended or adjusted under 35 U.S.C. 154(b) by 63 days.

(21) Appl. No.: 17/138,049

(22) Filed: Dec. 30, 2020

(65) Prior Publication Data

US 2021/0211903 A1 Jul. 8, 2021

Related U.S. Application Data

(60) Provisional application No. 62/956,399, filed on Jan. 2, 2020.

(51) Int. Cl.
| | |
|---|---|
| *H04W 24/04* | (2009.01) |
| *H04W 16/18* | (2009.01) |
| *H04W 72/30* | (2023.01) |
| H04W 84/12 | (2009.01) |

(52) U.S. Cl.
CPC ......... *H04W 24/04* (2013.01); *H04W 16/18* (2013.01); *H04W 72/30* (2023.01); *H04W 84/12* (2013.01)

(58) Field of Classification Search
CPC ... H04W 24/04; H04W 16/18; H04W 72/005; H04W 84/12; H04W 76/40; H04L 45/02; H04L 45/16; H04L 12/18; H04L 67/2871
See application file for complete search history.

(56) References Cited

U.S. PATENT DOCUMENTS

| | | | | |
|---|---|---|---|---|
| 5,842,027 | A * | 11/1998 | Oprescu | G06F 1/32 713/340 |
| 8,149,811 | B2* | 4/2012 | Nabar | H04B 7/2618 370/445 |
| 8,780,872 | B1* | 7/2014 | Ramamurthy | H04B 7/024 370/328 |
| 10,922,957 | B2* | 2/2021 | Rhoads | H04N 1/00307 |
| 2004/0103187 | A1* | 5/2004 | Jacob | H04L 43/00 709/224 |
| 2004/0153541 | A1* | 8/2004 | Ochi | H04L 67/02 709/224 |
| 2005/0044268 | A1* | 2/2005 | Johnston-Watt | H04L 41/0816 709/238 |

(Continued)

FOREIGN PATENT DOCUMENTS

| | | |
|---|---|---|
| CN | 104540189 B | 4/2015 |
| EP | 1194876 B1 | 7/2011 |
| EP | 3324587 A1 | 5/2018 |

*Primary Examiner* — Hassan A Phillips
*Assistant Examiner* — Prenell P Jones
(74) *Attorney, Agent, or Firm* — BROWDY AND NEIMARK, P.L.L.C.

(57) ABSTRACT

The present invention discloses a product (MEDIATOR) and a method facilitating unidirectional broadcast or multicast of any kind of data from a source communication device to a plurality of client communication devices, within a Wireless Local Area Network (WLAN), using a one-to-many communication by using the MEDIATOR that mediate between the source communication device and clients and gives the option of serving a plurality of clients, more than the limitation of the inherent source communication device AP.

18 Claims, 9 Drawing Sheets

(56) References Cited

U.S. PATENT DOCUMENTS

| | | | |
|---|---|---|---|
| 2005/0060380 A1* | 3/2005 | Dearle | H04L 67/1008 709/206 |
| 2005/0063409 A1 | 3/2005 | Oommen et al. | |
| 2005/0144328 A1* | 6/2005 | McBeath | H04L 12/46 709/251 |
| 2005/0286466 A1 | 12/2005 | Tagg et al. | |
| 2006/0215581 A1* | 9/2006 | Castagnoli | H04L 41/0663 370/254 |
| 2007/0087756 A1* | 4/2007 | Hoffberg | G06Q 20/065 455/450 |
| 2008/0016198 A1* | 1/2008 | Johnston-Watt | H04L 67/1008 709/223 |
| 2008/0096560 A1* | 4/2008 | Felske | H04W 36/00837 455/436 |
| 2008/0162637 A1* | 7/2008 | Adamczyk | H04L 67/24 709/204 |
| 2008/0222604 A1* | 9/2008 | Murphy | G06F 8/65 717/120 |
| 2010/0070606 A1* | 3/2010 | Shenfield | G06Q 30/02 709/217 |
| 2011/0009107 A1* | 1/2011 | Guba | H04W 4/027 455/418 |
| 2011/0051703 A1 | 3/2011 | Fulknier et al. | |
| 2011/0103283 A1 | 5/2011 | Kale et al. | |
| 2011/0208532 A1* | 8/2011 | Rahman | G16H 10/60 726/4 |
| 2011/0296501 A1 | 12/2011 | Drovdahl et al. | |
| 2012/0188101 A1* | 7/2012 | Ganot | G07B 15/02 340/932.2 |
| 2012/0294199 A1* | 11/2012 | Anchan | H04W 4/10 370/328 |
| 2013/0086245 A1* | 4/2013 | Lu | H04L 12/66 709/250 |
| 2013/0142056 A1* | 6/2013 | Abplanalp | H04L 41/02 370/254 |
| 2013/0201316 A1* | 8/2013 | Binder | H04L 67/12 701/2 |
| 2013/0210346 A1* | 8/2013 | Ling | H04W 76/10 455/41.1 |
| 2013/0273857 A1* | 10/2013 | Zhang | H04W 72/082 455/73 |
| 2014/0040979 A1* | 2/2014 | Barton | H04W 12/06 726/1 |
| 2014/0064229 A1* | 3/2014 | Lee | H04W 48/16 370/329 |
| 2014/0286321 A1 | 9/2014 | Balian et al. | |
| 2015/0080024 A1* | 3/2015 | Khorashadi | H04W 4/029 455/456.2 |
| 2015/0119033 A1* | 4/2015 | Maria | H04W 48/18 455/435.2 |
| 2015/0135214 A1* | 5/2015 | Reisman | H04H 20/38 725/37 |
| 2015/0142986 A1* | 5/2015 | Reznik | H04L 67/141 709/228 |
| 2015/0145944 A1* | 5/2015 | Stonefield | H04W 4/18 348/14.02 |
| 2015/0181565 A1 | 6/2015 | Sirotkin et al. | |
| 2015/0201305 A1* | 7/2015 | Edge | H04W 4/021 455/456.3 |
| 2016/0198317 A1 | 7/2016 | Li et al. | |
| 2016/0234720 A1* | 8/2016 | Barany | H04W 28/22 |
| 2016/0276831 A1* | 9/2016 | Karlak | G06Q 50/06 |
| 2016/0364610 A1* | 12/2016 | Jung | G06V 30/248 |
| 2016/0381538 A1* | 12/2016 | Tan | H04W 4/90 455/404.2 |
| 2017/0017954 A1* | 1/2017 | McDonough | G06Q 20/308 |
| 2017/0082993 A1* | 3/2017 | Narain | G05B 15/02 |
| 2017/0251308 A1* | 8/2017 | Cook | H04M 1/72409 |
| 2018/0018863 A1* | 1/2018 | Al-Amin | G08B 13/19695 |
| 2018/0192258 A1* | 7/2018 | Vempati | H04W 4/10 |
| 2019/0036993 A1 | 1/2019 | Lavi | |
| 2019/0049968 A1* | 2/2019 | Dean | G06V 20/58 |
| 2019/0251832 A1* | 8/2019 | Longhenry | A47L 11/40 |
| 2019/0313246 A1* | 10/2019 | Nix | H04W 12/30 |
| 2020/0053729 A1* | 2/2020 | Borges | H04W 74/0808 |
| 2020/0078119 A1* | 3/2020 | Henderson | A61B 50/13 |
| 2020/0186494 A1* | 6/2020 | X | H04L 61/5014 |
| 2020/0244297 A1* | 7/2020 | Zalewski | H02N 11/002 |
| 2020/0389469 A1* | 12/2020 | Litichever | H04L 63/0236 |
| 2021/0036928 A1* | 2/2021 | Narayanan | H04W 8/26 |
| 2021/0076165 A1* | 3/2021 | Li | H04L 1/1642 |
| 2022/0167337 A1* | 5/2022 | Akoum | H04W 4/44 |

\* cited by examiner

METHODS AND SYSTEMS FOR SUPPORTING COMMUNICATION A PLURALITY OF CLIENT COMMUNICATION DEVICES IN A WIRELESS LOCAL AREA NETWORK

FIELD OF THE INVENTION

The present invention relates to the field of wireless local area networks (WLANs). More specifically, the present invention relates to the broadcast or multicast of data within the WLANs.

BACKGROUND OF THE INVENTION

The usage of Access Point (AP) or Hot Spot (HS) or Smartphones, as a means for setting up Wireless Local Area Network (WLAN) to connect clients via the said WLAN is ubiquitous. In such a configuration each client has a unique entity for connecting to an external communication network such as the Internet, through the WLAN unrelated to other clients communication. The number of clients connected to this WLAN is limited due to the inside communication configuration components data processing limitation and due to the heat capacity limitation of those components.

In current available APs or Routers or Hot Spots (HSs) the number of clients that each device can serve is limited. Each client is restricted to his own unique internet communication channel.

SUMMARY OF THE INVENTION

Aspects of embodiments of the present invention pertain to communication systems and method for supporting the establishment and management of WLAN, between a source communication device and a plurality of client communication devices.

According to some embodiments the system may include: (i) a source communication module comprising: at least one communication module configured to establish and manage a first local area network for a limited, first number $N_1$ of client communication devices; and at least one multicast or broadcast application configured to establish and manage a local area network; and (ii) a mediator device configured to: (a) communicate with the source communication device via the multicast or broadcast application and (b) establish and manage a second local area network between the source communication device and a second number $N_2$ of client communication devices, such that the second number of client communication devices $N_2$ that the mediator device enables networking with, is larger than the first number of client communication devices $N_1$ that the source communication device enables networking.

Aspects of embodiments of the present invention pertain to a product (MEDIATOR), methods and system for supporting unidirectional broadcast or multicast of any kind of data from a source communication device to a plurality of client communication devices, within a Wireless Local Area Network (WLAN), using a one-to-many communication pathway (routing), by using a unique mediator device configured, inter alia, to mediate between the source communication device and multiple client communication devices and enable serving a large number of users using corresponding large number of client communication devices, for overcoming typical communication related restrictions and limitations currently experienced in typical WLANs such as severe reduction in internet speed when the number of client devices using the WLAN increases or exceeds a maximal threshold and the like.

The mediator can be implemented as a standalone device or it can be connectable to the source communication device e.g. via USB (universal serial bus) connection.

It is noted herein that the term "client" relates to any communication and computing device such as a mobile phone, a tablet device, a personal computer (PC) etc. The terms "client(s)" and "client communication device(s)" may be used herein interchangeably.

According to some embodiments, prior to building the WLAN with the clients, the mediator may be configured to conduct a preliminary check including several instructions such as, WLAN name, password, number of allowed clients and more. Only then the mediator can start communicating with the clients to build the WLAN.

Those instructions may be received from the source communication device by direct communication between the source communication device and the mediator or the mediator may direct communicate the web (internet) to get the instructions, using cellular communication.

The mediator can be battery operated or powered from an external source. Each mediator can build several WLANs, where each WLAN can serve plural clients. The source communication device may be configured to operate with several mediators, each mediator being communicable with a number of clients, optionally operating at the same local (geographical) area.

The mediator may serve as an Access Point (AP) which serves the clients in a one-to-many data sharing in which one channel between the mediator and the server is created.

This may enable creating a WLAN support for a large number of clients $N_2$ (more than the limited number $N_1$ of clients enabled by the source communication device inherent AP). The connected clients receive the same data from the source communication device, hence don't consume more communication bandwidth when adding more clients (requires no special needs from the device with the addition of more clients).

In one embodiment of the invention the mediator connects directly to the BUS of the source communication device through a connector (USB, Micro USB, USB-C or equivalents) or through cable. In this configuration the mediator includes a WiFi transceiver which bypasses the WiFi transceiver of the source communication device, supporting multiple clients connection in a one-to-many communication and communicate directly with the source communication device microprocessor to enable a plurality of clients connected to the local WLAN.

In another embodiment of the invention only the source communication device can transmit while clients only receive data (listen).

In another embodiment of the invention both source communication device and clients can transmit one at a time while all other listen.

There are three basic operating phases:
Communication between the source communication device and the mediator.
Communication between the mediator and clients.
Communication between the source communication device and clients through the mediator.

The present invention provides a communication system supporting the establishment and management of local area network, between one source communication device and a plurality of client communication devices, said system comprising a mediator device functioning as an AP or Router or HS. for a source device configured to connect multiple client devices, wherein the mediator device is comprised of a (MAC) WiFi transducer having an unlimited list of MAC configured to connect simultaneously plurality of clients communication devices, and work in one-to-all or one-to-many phase using multicast or broadcast or UDP protocol According to some embodiments of the present invention the source communication module comprising:

at least one communication module configured to establish and manage a first local area network for a limited, first number $N_1$ of client communication devices; and at least one multicast or broadcast application configured to establish and manage a local area network;

According to some embodiments of the present invention the at least one mediator device is configured to communicate with the source communication device via the multicast or broadcast application and establish and manage a second local area network between the source communication device and a second number $N_2$ of client communication devices, such that the second number of client communication devices $N_2$ that the mediator device enables networking with, is larger than the first number of client communication devices $N_1$ that the source communication device enables networking. is;

According to some embodiments of the present invention the mediator comprise a Microprocessor configured to serve as access point and support the creation of the local area network, transfer/multicast data to plurality of client devices from the source device.

According to some embodiments of the present invention each of the

Multiple client communication devices is comprised of
at least one communication module configured to establish and manage local area network.
At least one application configured to join the communication local area network created by the source device and the mediator device;)

According to some embodiments of the present invention the mediator communication module is a single MAC Wi-Fi transceiver configured to serve for communicating with the Communication source device and for communicating with the clients.

According to some embodiments of the present invention the mediator further comprise a BT transceiver configured to communicate either with the communication source device or with the clients to build the WLAN while the Wi-Fi transceiver serves for the communication with its increased power for increased distance and increased communication speed.

According to some embodiments of the present invention the mediator further comprises a second communication module implemented as a second Wi-Fi component which communicates with the clients.

According to some embodiments of the present invention the mediator further comprises a second communication module implemented as BT transceiver component communicating with the source communication device side.

According to some embodiments of the present invention the mediator further comprises a second communication module implemented as an NFC/RFID transceiver communicating with the source communication device side.

According to some embodiments of the present invention the source communication device and clients are using an IP address only to enable the local network not supporting communication with the WEB.

According to some embodiments of the present invention the source communication device and clients join the WLAN using their MAC address are not provided with an IP address to support communication with the WEB.

According to some embodiments of the present invention the mediator communicates with the Internet using cellular communication.

According to some embodiments of the present invention the microprocessor manages the network configuration data inside the mediator and the schedule for data transfer between the source communication device and the mediator.

According to some embodiments of the present invention the first communication session between the source communication device and the mediator uses a serial bus of the two devices, which are connected directly via a cable or connector.

According to some embodiments of the present invention the communication between source communication device and mediator is implemented using at least one of the following communication protocols WiFi, BT or NFC/RFID.

According to some embodiments of the present invention the communication between source communication device and mediator is established through a data network for obtaining set of configuration instructions;

According to some embodiments of the present invention the acceptance of a client as a member of the WLAN is dictated by the source communication device or from the web and installed in the memory of the mediator.

According to some embodiments of the present invention the communication between the network and the source communication device and client devices is established through the MEDIATOR by applying the following steps: the client joins the SSID created the source device by entering a given password, wherein the mediator device checks client number and approves the client joining the network.

According to some embodiments of the present invention the source communication device communicate with client via the mediator, by applying the following steps: the source communication device Start sending Packets in UDP format, the mediator accepts packets in memory and multicast the packets in UDP using the WIFI network, wherein the client side the packets are accepted and the content is presented to the client.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1A:
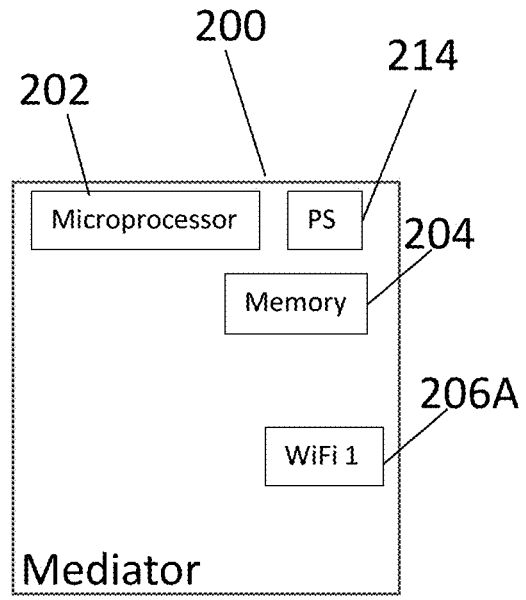
FIG. 1A is a block diagram illustrating a mediator for enabling a single source communication device to communicated with a large number of client communication devices via a wireless local area network (WLAN), according to some embodiment's.

In order for the AP or Router or HS to provide this service without limiting the speed of communication (bandwidth), it should include high speed microprocessor, high speed and high capacity memory and high-speed RF component. As the common available AP Router or HS or Smartphone components are limited in their ability to process data fast enough and in order not to overheat the components, the number of clients that connect without reducing the quality of the service is limited.

On certain scenarios, a unilateral one-to-many type of communication between a single source communication node and plurality of client nodes on the WLAN is required, in order to share non-unique data among a large number of clients. In this case only one transmission channel between the source communication node AP or Router or HS and clients is required, and this channel serves all the clients and no reduction in speed of data occurs while increasing the number of clients. This case is known as data multicasting or broadcasting. As an AP or Router or HS or Smartphone while used as an AP can be used in both requirements, either as a single channel to each client or as one-to-many mode, and the way of operation is not known while setting the WLAN the limitation for number of clients is an inherent requirement of the AP Router or HS or Smartphone and cannot be controlled or changed by the device owner.

As an example for such a scenario may be a teacher presenting a lecture comprising of multimedia content and speech to a group of 100 students. The standard solution for facilitating one-to-many communication in WLAN system involves broadcasting or multicasting the data over User Datagram Protocol (UDP) which is typically not implemented and support in mobile smartphones.

The current state of the art imposes a physical restriction on AP Router HS or Smartphone enclosed APs, severely limiting the manageable number of individual clients that can connect to the WLAN and get service in multicasting/broadcasting operational mode.

The number of servable clients such as access points (APs), hot spots (HSs) and/or a Routers, in a typical wireless local area network (WLAN) is limited and controlled by the MAC Address list. Each client communication component has an identity number call the MAC Address which is set during production of the component and can not be changed by the user. When a client tries to connect to a WLAN it is recognized by its MAC Address. This identification is done in the WiFi component and only if the client is approved, it can connect to the WLAN and get all the services of the WLAN.

The present invention enables a larger number of clients (larger than typically enabled by a single communication device's WLAN options), to connect to a single WLAN, using a designated mediator as further described below. Such mediator may be designed with a WiFi component that supports the following: plural clients, one-to-many or one-to-all communication, multicast or broadcast e.g. using user datagram protocol (UDP).

A source communication device as used herein the application may be any communication and computing device such as a mobile communication device e.g. a Smartphone, a tablet device, a laptop computer, a personal computer (PC), and the like, or any other device using microprocessor and communication component, which can establish WLAN for other client communication devices. a client communication device as used herein the application may include any mobile communication device, configured to join WLAN, such as a smart phone, a tablet device, a mobile phone, a laptop, etc. or any other device using microprocessor and communication component.

According to some embodiments, the mediator as used herein the application, may be a mobile communication device, which serve as access point for WLAN, enabling to manage WLAN for the source communication device in communication.

Each source communication device or client communication device may include any combination of the following components: a microprocessor, readable memory, one or two WiFi transceivers or Bluetooth (BT) transceiver or NFC/RFID component or cellular option and peripherals components and an executable group of instructions (application) to operate the MEDIATOR and WLAN.

According to some embodiments of the invention, as seen in FIG. 1A the mediator may include the following components: microprocessor, readable memory, only one Wi-Fi transceiver, peripherals components and an application (executable group of instructions) to manage the MEDIATOR and WLAN.

According to these embodiments, the mediator may have only one Wi-Fi transceiver component (optionally MAC Wi-Fi transceiver) that serves both for communicating with the source communication device and for communicating with the plurality of client communication devices.

Figure 1B:
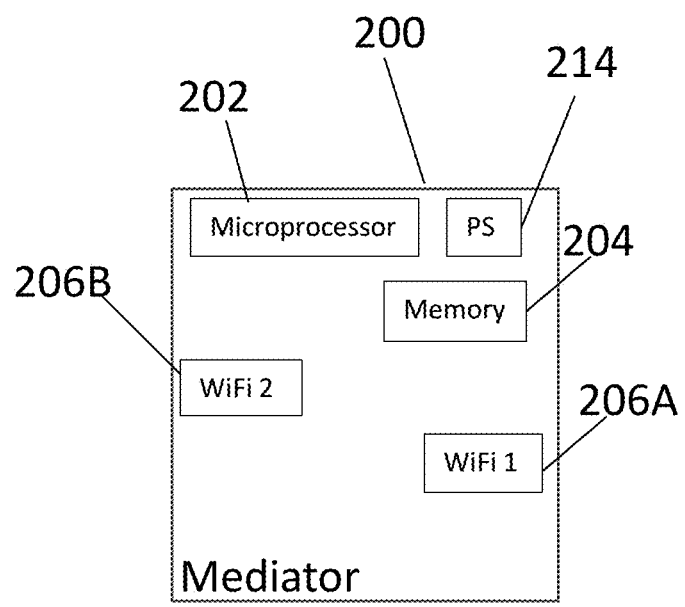
FIG. 1B is a block diagram of the mediator, according to some embodiments of the present invention.
Figure 1C:
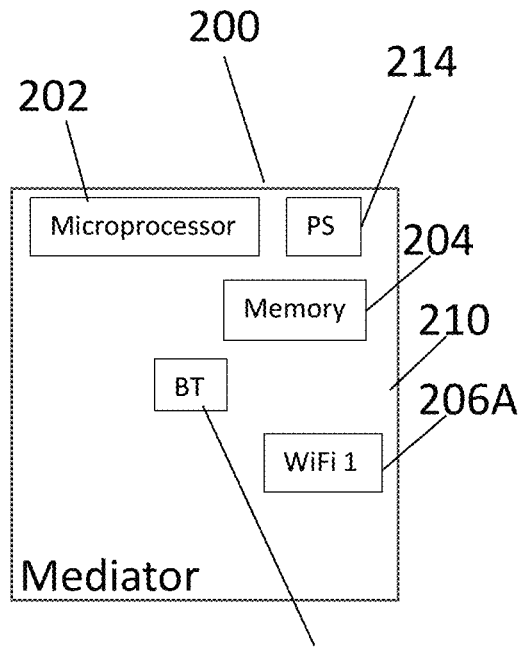
FIG. 1C is a block diagram of the mediator, according to some embodiments; of the present invention.
Figure 1D:
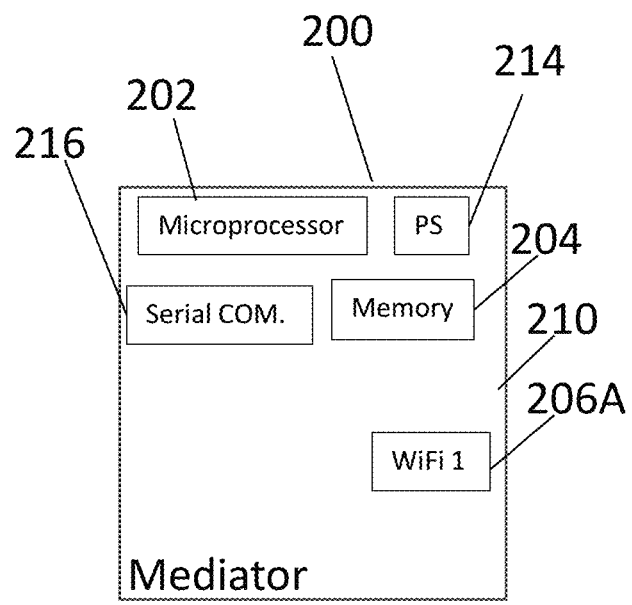
FIG. 1D is a block diagram of the mediator, according to some embodiments.

According to another embodiment of the invention, as seen in FIG. 1C the mediator may also include a Bluetooth (BT) transceiver which can communicate either with the source communication device or with the client communication devices, in order to build the WLAN while the Wi-Fi transceiver later serves for the communication with its increased power for increased distance and increased communication speed.

In another embodiment of the present invention the mediator is connecting to the source communication device through radiofrequency (RF) communication such as WiFi, BT or NFC/RFID or cellular. In this option the mediator includes in addition to WiFi component which communicates with the clients a second communication module such as one of the following options:

an additional WiFi transceiver component, communicating with the source communication device, see FIG. 1B.

Figure 1E:
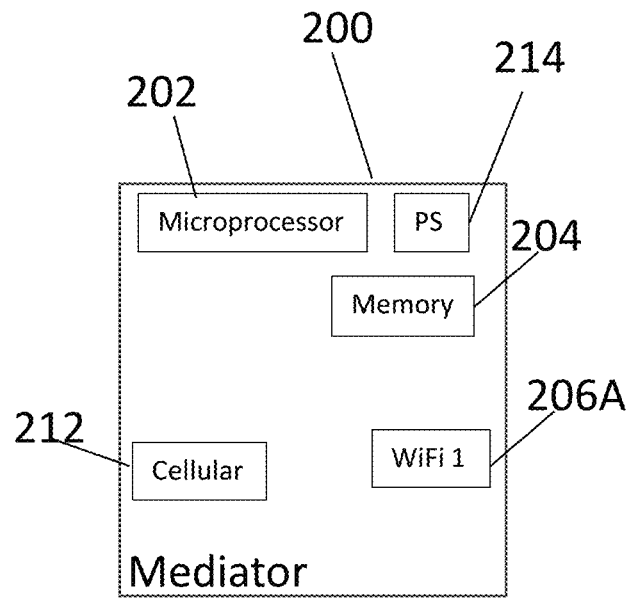
FIG. 1E is a block diagram of the mediator, according to some embodiments; of the present invention.
Figure 1F:
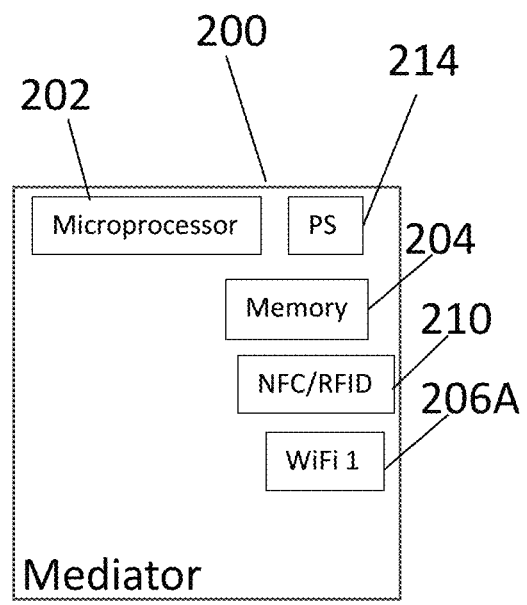
FIG. 1F is a block diagram of the mediator, according to some embodiments; of the present invention.

BT transceiver component communicating with the source communication device side and an option for another one on the client side see FIG. 1C.

an NFC/RFID transceiver communicating with the source communication device side, see FIG. 1F.

According to some embodiments, each client communication device may be required to receive permission from the source communication device in order to join the WLAN (e.g. via an automatic process or requiring user identify code(s) input).

In another embodiment, a client communication device can receive permission from the MEDIATOR to join the WLAN.

In another embodiment, the source communication device and client communication devices may use an IP address.

In yet another embodiment, of the invention the source communication device and client communication devices joining the WLAN by using their MAC address may not be provided with an IP address which allows them to use the IP address to surf the Internet through their cellular connection.

According to some embodiments, each communication device (client and/or source) may be limited to a single IP Address for surfing the Internet through the mediator's established second WLAN either by using the WiFi channel or the cellular channel of the mediator. In case there is more than one IP Address available in the same device, then one IP Address may be kept free for Cellular surfing. If we use the Wi-Fi Smartphone component for the local WLAN using only the MAC Address then the IP Address may be later used for surfing the internet through their cellular channel.

Figure 2:
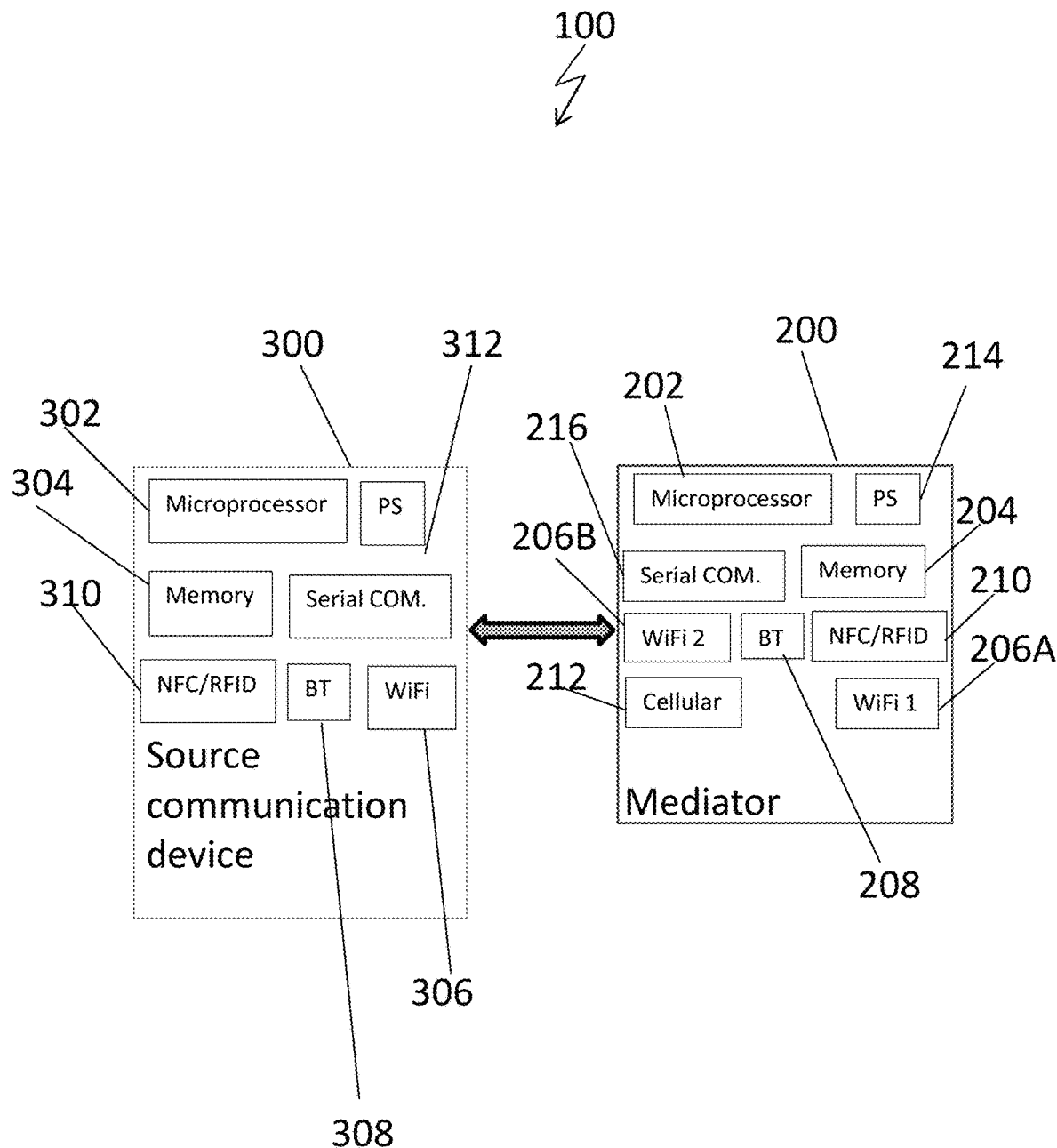
FIG. 2 is a diagram of a first-phase of communication between a source communication device and a mediator, according to some embodiments; of the present invention.

FIG. 2 illustrates a first phase of establishing a Wireless Local Area Network (WLAN) 100 in accordance with some embodiments of the present invention. At the first phase of a Wireless Local Area Network (WLAN) 100 the mediator 200 and a source communication device 300 communicate to update the WLAN parameters.

Figure 5:
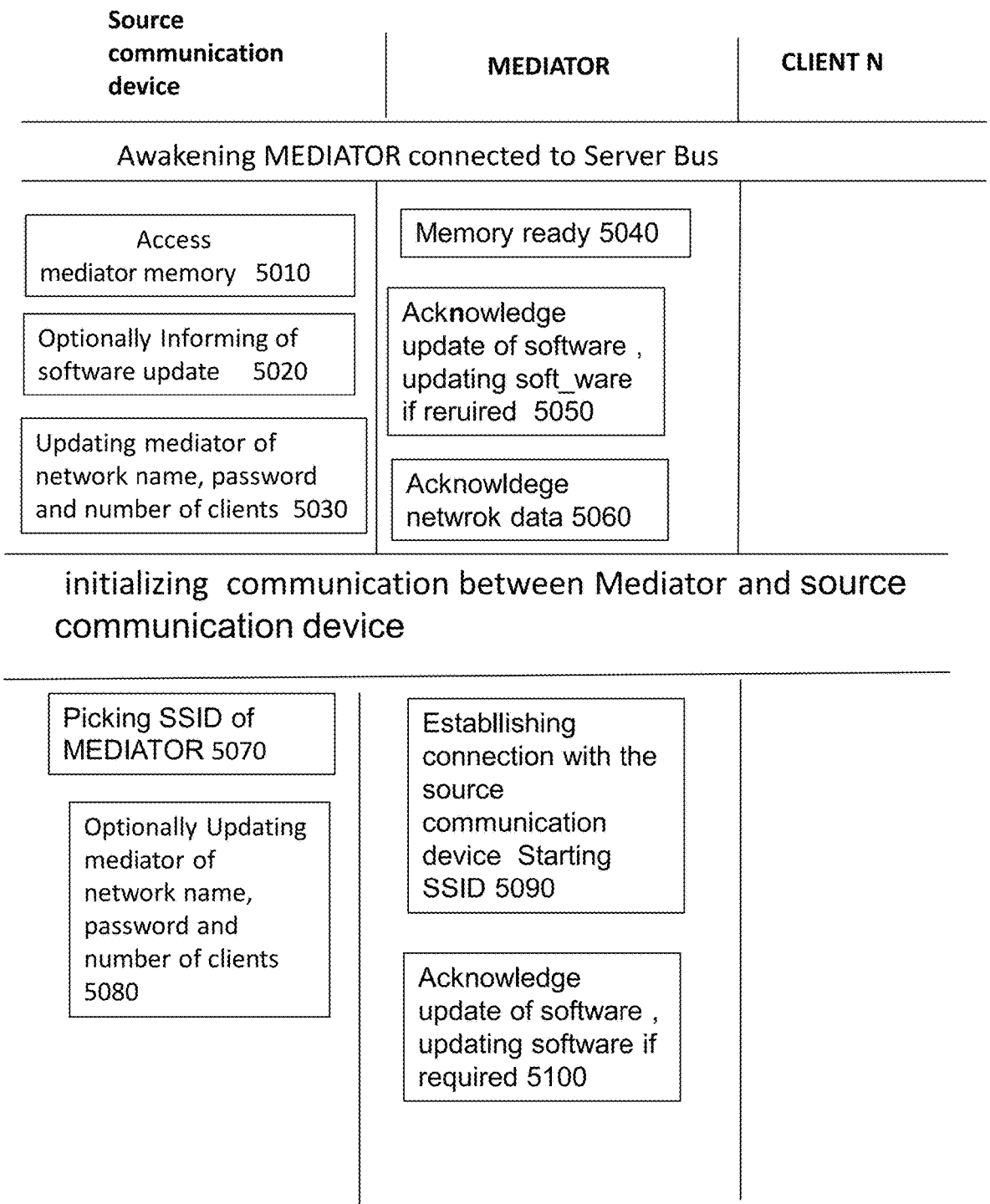
FIG. 5 is a flowchart illustration of the first-phase of communication between the source communication device and the mediator, according to some embodiments; of the present invention

In this phase, the mediator 200 communicates with either the source communication device 300 as seen in FIG. 5 or with the Internet using cellular communication 212 according to some embodiments (as seen in FIG. 1E).

The power source 214 may be implemented as inner battery or using external energy source.

The microprocessor 202 manages the network configuration data inside the mediator 200 and the scheduling/timing for data transfer between the source communication device 300 and the mediator 200. The memory 204 of the source communication device keeps a set of orders to operate the mediator 200 and parameters from the source communication device 300.

The second WiFi transceiver 206A which communicates with the clients is not active in this configuration.

According the some embodiments of the present invention in the first communication session between the source communication device 300 and the mediator 200, uses a serial bus of the two devices, serial bus 216 and serial bus 314, are connected directly either via a cable or connector.

In this case the mediator 200 bypasses the input components of the source communication device 300 and directly communicates with the microprocessor 302 of the source communication device 300, thus, saving components in the mediator 200, time of communication and time of processing data on both sides source communication device 300 and mediator 200.

In accordance with another embodiment of the present invention the communication between source communication device 300 and mediator 200, is implemented using RF communication such as WiFi or BT or NFC/RFID. In this case the WiFi 2 transceiver 206B or the BT transceiver 208 or the first NFC/RFID transceiver 210 in the mediator 200 communicate with the mating component of the source communication device.

In accordance with another option of the present invention, the communication between source communication device 300 and mediator 200, the mediator 200 can be established by directly the Internet) to retrieve the set of configuration instructions bypassing the source communication device 300.

Figure 3:
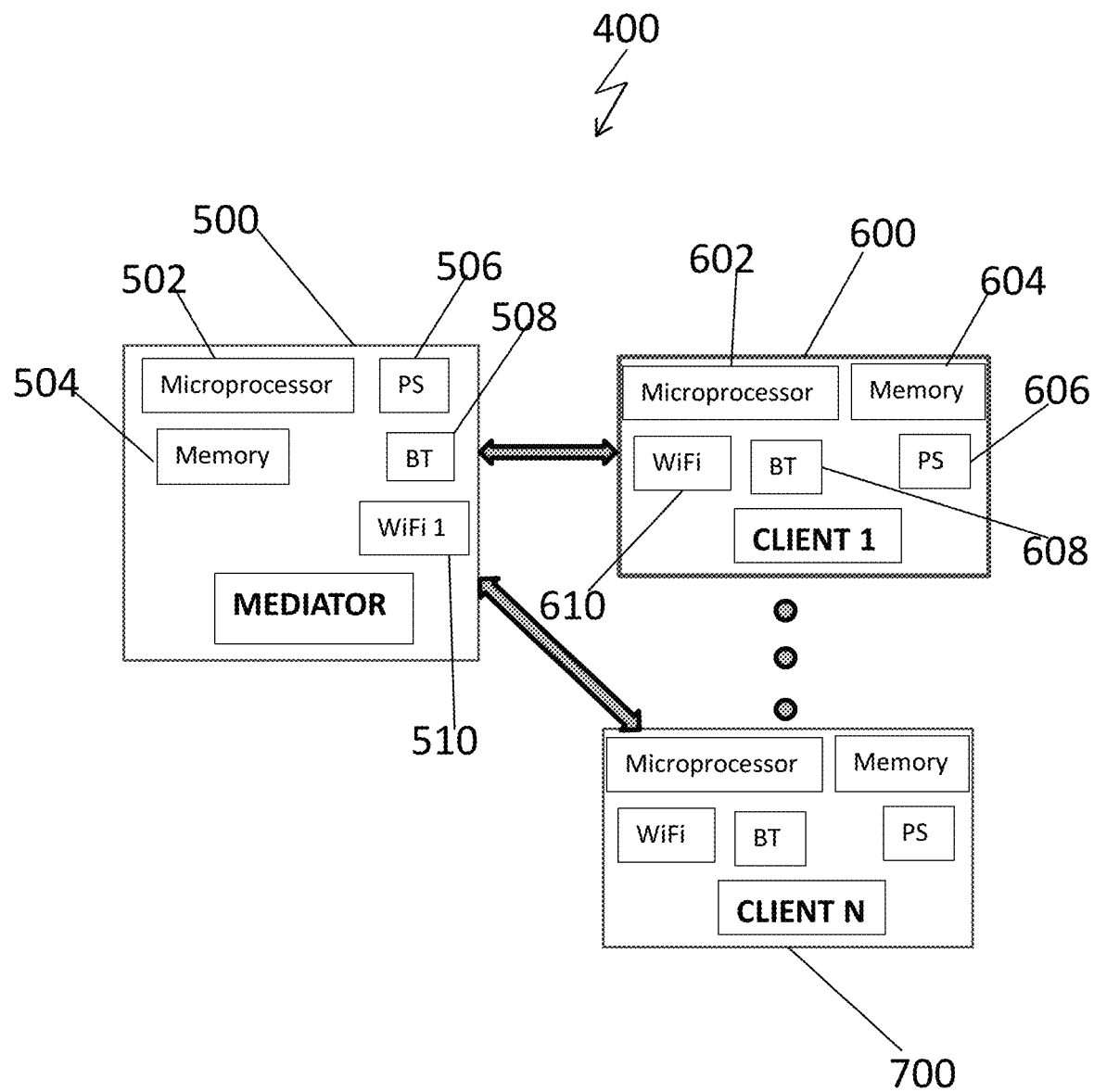
FIG. 3 is a diagram of a second-phase of communication between the mediator and a client communication device according to some embodiments of the present invention.

FIG. 3 illustrates a second phase of managing the Wireless Local Area Network (WLAN) 400 in accordance with some embodiments of the present invention. In this stage, the mediator 500 communicates with multiple clients 600, 700 and enable the users to sign them in the WLAN according to the parameters defined in the first phase.

The mediator 500 comprises a microprocessor 502, a memory 504, a power source (implemented as inner battery or using external energy source) 506, a first Bluetooth (BT) transceiver 508, and a WiFi 1 transceiver 510.

Any client 600 or 700 comprises a microprocessor 602, a second memory 604, a power source (implemented as inner battery or using external energy source) 606, a Bluetooth (BT) transceiver 608, and a WiFi transceiver 610.

The number of client members in the WLAN is controlled by the mediator 500 and limit number of clients defined by the set of instructions defined in the first phase.

The communication with the clients can be done via the WiFi transceiver 510 or through the first BT transceiver 508. If done via the first BT transceiver 508, the mediator 500 and the client 600 have to be in close proximity. However, if done via the WiFi 1 transceiver 510, the mediator 500 and the client 600 may be in distance with one another.

In accordance with some embodiments of the present invention, the acceptance of a client as a member of the WLAN is dictated by the source communication device or from the web (Internet) and installed in the memory of the mediator 500. In some cases, an approval by the source communication device is needed as well.

The client 600 picks the required network settings in his application either via WiFi transceiver 602 or the BT transceiver 604, signs in with the requested password, and wait for an acknowledge response from the mediator 500.

When the client receives the required acknowledge response, he/she is signing in the WLAN and is enabled to receive data from the source communication device.

Figure 4:
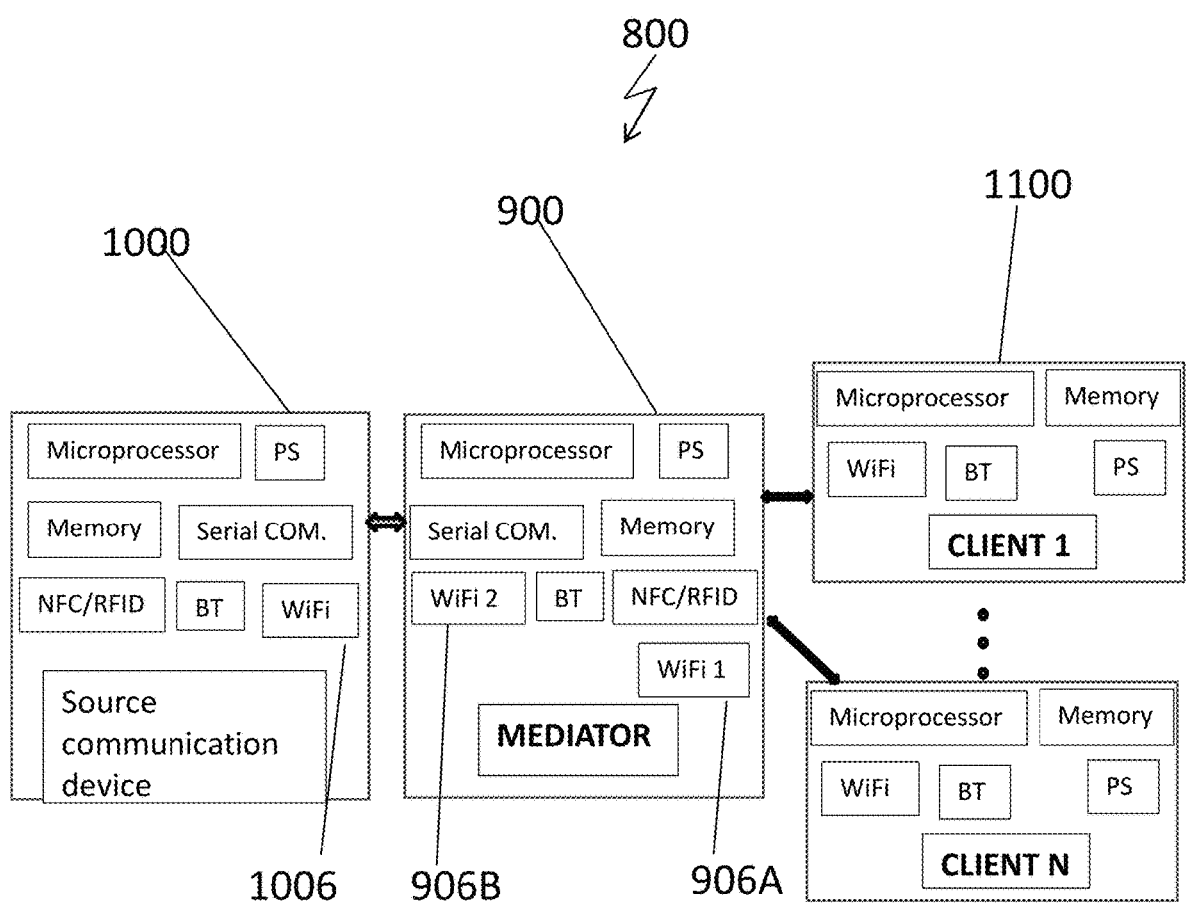
FIG. 4 is a diagram of the third-phase of communication between the source communication, the mediator and the client communication device according to some embodiments of the present invention.

FIG. 4 illustrates a third phase of a Wireless Local Area Network (WLAN) 800 in accordance with some embodiments of the present invention.

In this third phase of a Wireless Local Area Network (WLAN) 800, the WLAN is used to pass data between the source communication device and the clients or between one of the clients and the source communication device and other clients, only in one-to-many or one to all communication manner.

The third phase of a Wireless Local Area Network (WLAN) 800 comprises a mediator 900 source communication device 1000, and multiple clients such as client 1100.

In this mode the source communication device 1000 uses its WiFi transceiver 1006 to send data to the mediator 900 which transfers this data forward to the clients, for instance, to client 1100.

In accordance with some embodiments of the present invention, the mediator 900 has two WiFi transceivers, a first WiFi 1 transceiver 906A and a second WiFi 2 transceiver 906B where the second WiFi transceiver 906B is used to communicate with the source communication device 1000 and another transceiver 906A is used to communicate with the clients such as client 1100.

In accordance with other embodiments of the present invention, the mediator 900 has a single WiFi transceiver that first communicates with source communication device 1000 using the receiver of the WiFi and then communicates with plurality of clients such as client 1100 using the transmitter of the WiFi in a time division multiplexing manner.

In accordance with other embodiments of the present invention, one of the clients, for instance, client 1100 sends data to mediator 900 which later transmits the data to the source communication device 1000 and to all the other clients. In this option the mediator 900 may have a single WiFi transceiver that is used as a receiver and then as a transmitter. Alternatively, the mediator 900 may have two WiFi transceivers one is used as a receiver only and the other one is used as a transmitter only.

FIG. 5 is a flowchart illustration of the first phase of communication between the source communication device and the mediator according to some embodiments of the present invention.

At the first phase, the mediator is activated/initiated, by applying the following steps:

The source communication device accesses the mediator memory, e.g. by transmitting commands for initiating a WLAN group at the mediator, optionally informing the mediator of software update and the mediator acknowledge update of software and updates software if required. Optionally updating the mediator of network name, password and number of clients.

At the second phase of initializing communication between Mediator and server are applied the following steps:

The source communication device picks SSID of mediator, the mediator establishes, connection with the source communication device starting SSID, optionally the source communication device updates the mediator of network name, password and number of clients and the mediator acknowledge update of software and updates the software if required.

The Second phase includes the communication between mediator and each client to build the WLAN.

Figure 6:
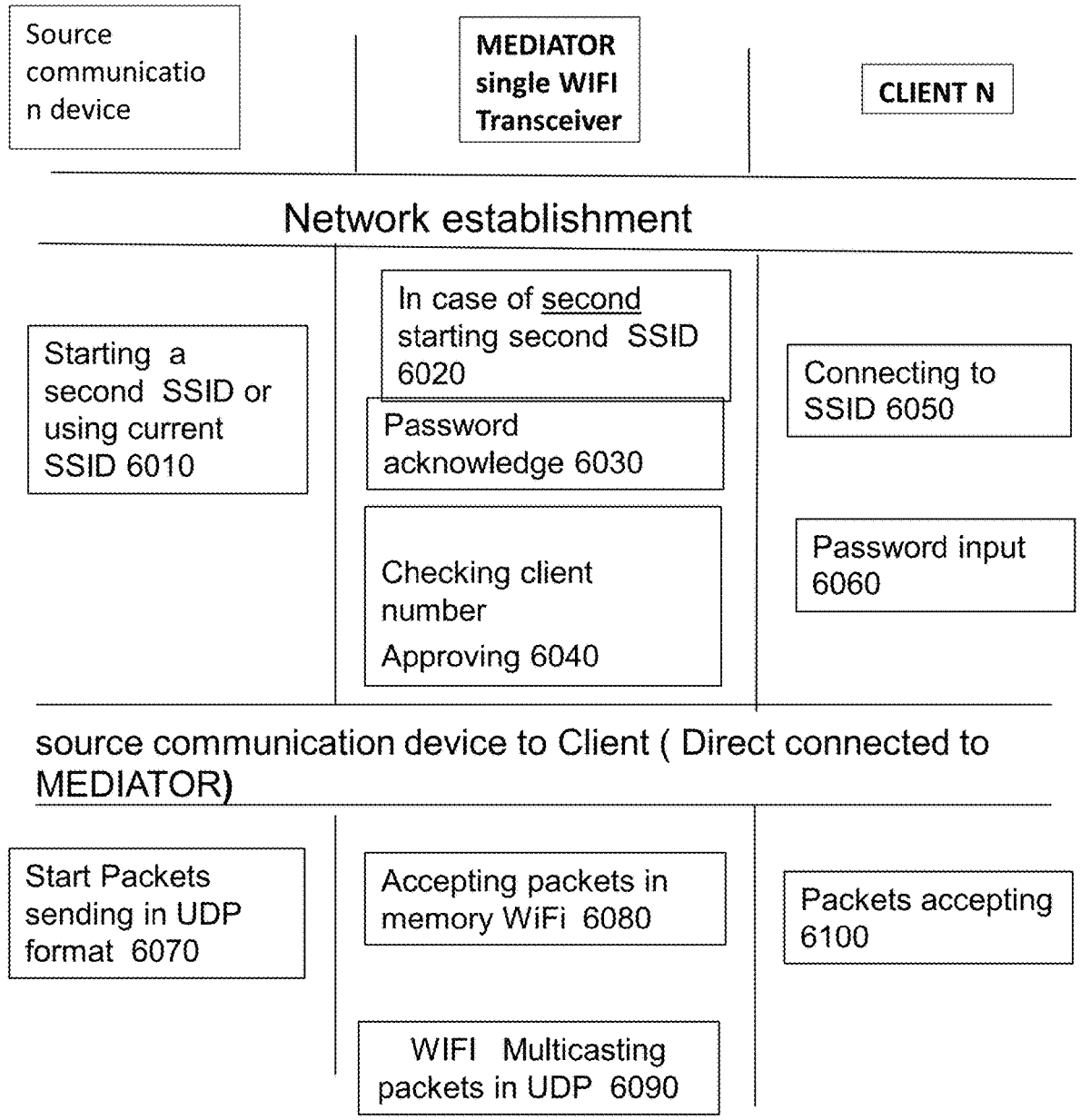
FIG. 6 is a flowchart illustration of the next-phase of communication between the source communication device, the mediator (using single WIFI transceiver) and the client communication device, according to some embodiments; and of the present invention

FIG. 6 is a flowchart illustration of the next phase of communication between the source communication device, the mediator using single WIFI transceiver and the client communication device according to some embodiments of the present invention.

In the third phase a network creation between the source communication device and client devices through mediator are applied the following steps:

The source communication device starts a second SSID or using current SSID, in case of second SSID the mediator starts a second SSID. The client joins the SSID by entering a given password. The mediator checks client number and approves the client joining the network.

In the fourth phase, the source communication device communicate with client via the MEDIATOR, applying the following steps:

The source communication device Start sending Packets in UDP format, the mediator accepts packets in memory and multicast the packets in UDP using the WIFI network (optionally WIFI MAC network). At the client side the packets are accepted and the content is presented to the client.

Figure 7:
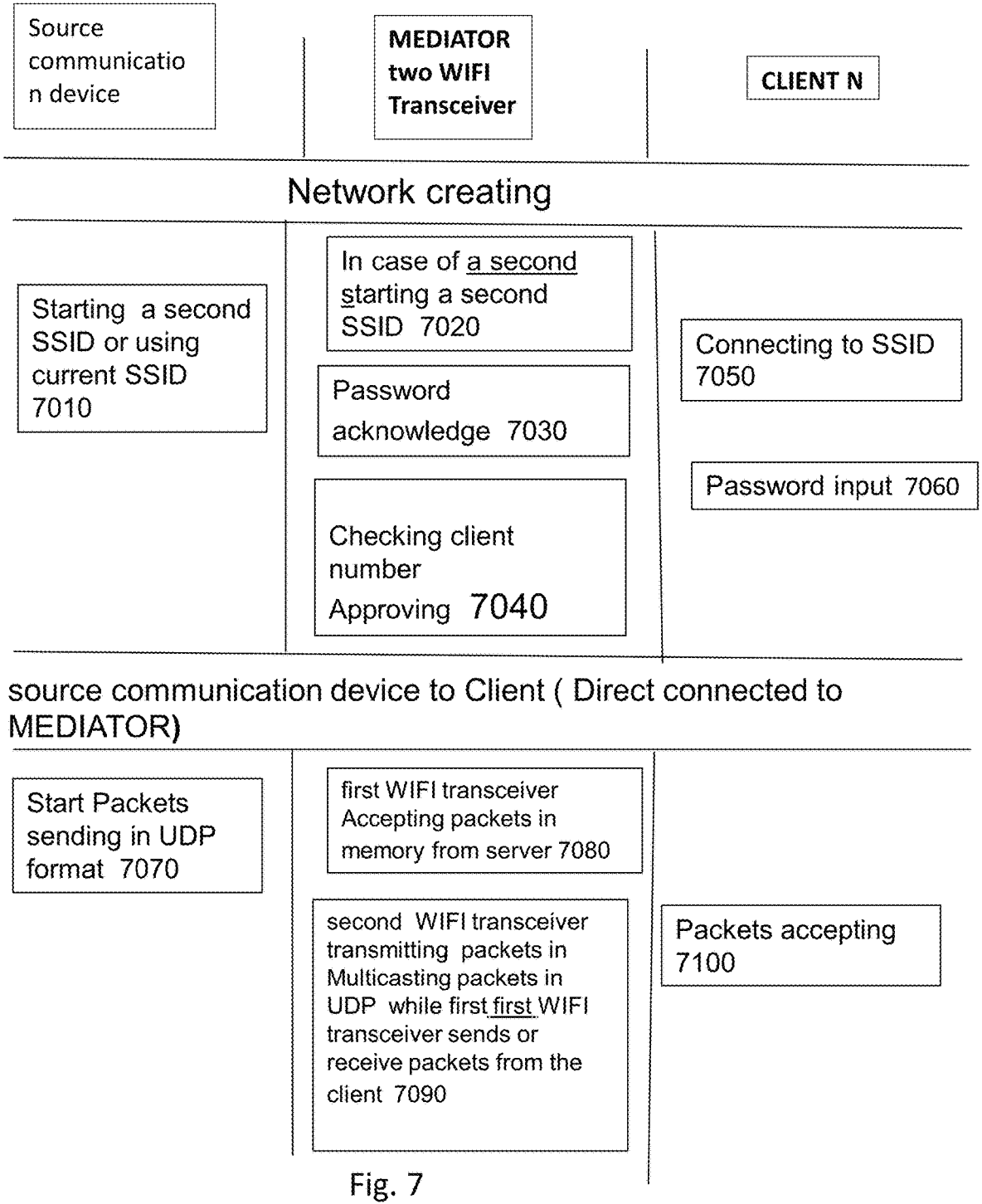
FIG. 7 is a flowchart illustration of the next-phase of communication between the source communication device, the mediator (using two WIFI transceivers) and the client communication device. according to some embodiments of the present invention

FIG. 7 is a flowchart illustration of the next phase of communication between the source communication device, the mediator and the client communication device using two WIFI transceivers according to some embodiments of the present invention In the third phase of establishing communication between the source communication device in which are associated with Mediator with client devices, this process applied the following steps:

The source communication device starts a second SSID or using current SSID, in case of second SSID the mediator starting a second SSID and the client joins the SSID by entering a given password. The mediator checks client number and approves the client joining the network.

In the fourth phase the source communication device communicates with client via the mediator by applying the following steps:

The source communication device starts sending packets in UDP format, the mediator accepts packets in memory by the first transceiver while the WIFI transceiver transmits packets by multicasting packets in UDP to the client. At the client side, the packets are accepted and the content is presented to the client.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include a program, which may be written in any conventional programming language, and a machine for executing the program such as but not limited to a general purpose computer which may optionally be configured or activated in accordance with the teachings of the present invention. Any of the teachings incorporated herein may wherever suitable operate on signals representative of physical objects or substances. Throughout the specification, terms such as, "processing", "computing", "estimating", "selecting", "calculating", "determining", "generating", "associating", "obtaining" or the like, refer to the action and/or processes of a computer that manipulates and/or transforms data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods and modules shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A communication system supporting the establishment and management of local area networks, between one source communication device and a plurality of client communication devices, said system comprising: a mediator device functioning as an access point (AP) or Router or hot spot (HS) for a source device configured to connect multiple client communication devices, wherein the mediator device is comprised of a media access control (MAC) WiFi transducer having a list of MAC addresses provided with or without an internet protocol (IP) address, configured to connect and transmit content from the source device simultaneously to the plurality of clients communication devices based on the their MAC address, and work in one-to-all or one-to-many phase using only one way communication protocol including at least one of multicast or broadcast or user datagram protocol (UDP protocol);
   at least one communication module configured at the source communication device to establish and manage a first local area network for a limited, first number N1 of client communication devices; and
   at least one multicast or broadcast application at the source communication device configured to establish and manage a local area network;
   wherein the at least one mediator device is configured to communicate with the source communication device via the multicast or broadcast application and establish and manage a second local area network between the source communication device and a second number N2 of client communication devices, such that the second number of client communication devices N2, which the mediator device enables networking with, is larger than the first number of client communication devices $N_1$ for which the source communication device enables networking.

2. The system of claim 1 wherein the mediator device comprises a Microprocessor configured to serve as access point and support the creation of the local area network, transfer/multicast data to plurality of client communication devices from the source device.

3. The system of claim 2 wherein each of the Multiple client communication devices is comprised of
   at least one communication module configured to establish and manage local area network,
   At least one application configured to join the communication local area network created by the source device and the mediator device.

4. The communication system of claim 1 wherein mediator device is a single MAC Wi-Fi transceiver configured to serve for communicating with the Communication source device and for communicating with the client communication devices.

5. The communication system of claim 1 wherein the mediator device further comprises a Bluetooth (BT) transceiver configured to communicate either with the communication source device or with the client communication devices to build a wireless local area network (WLAN), and a Wi-Fi transceiver configured to communicate with its increased power for increased distance and increased communication speed.

6. The communication system of claim 1 wherein the mediator device further comprises a communication module implemented as a second Wi-Fi component which communicates with the client communication devices.

7. The communication system of claim 1 wherein the mediator device further comprises a communication module implemented as BT transceiver component communicating with the source communication device side.

8. The communication system of claim 1 wherein the mediator device further comprises a communication module implemented as a near-field communication/radio-frequency identification (NFC/RFID) transceiver communicating with the source communication device side.

9. The communication system of claim 1 wherein the source communication device and client communication devices are using an IP address only to enable the local network not supporting communication with the WEB.

10. The communication system of claim 1 wherein the source communication device and client communication devices joining the WLAN using their MAC address are not provided with an IP address to support communication with the WEB.

11. The communication system of claim 1 wherein the mediator device communicates with the Internet using cellular communication.

12. The communication system of claim 1 wherein the microprocessor manages the network configuration data inside the mediator device and the schedule for data transfer between the source communication device and the mediator device.

13. The communication system of claim 1 wherein the first communication session between the source communication device and the mediator device uses a serial bus of the two devices, which are connected directly via a cable or connector.

14. The communication system of claim 1 wherein the communication between source communication device and mediator device is implemented using at least one of the following communication protocols WiFi, BT or NFC/RFID.

15. The communication system of claim 1 wherein the communication between source communication device and mediator device is established through a data network for obtaining a set of configuration instructions.

16. The communication system of claim 1 wherein the acceptance of a client communication device as a member of the WLAN is dictated by the source communication device or from the web and installed in the memory of the mediator device.

17. The communication system of claim 1 wherein the communication between the network and the source communication device and client communication devices is established through the mediator device by applying the following steps: the client communication device joins a SSID (service set identifier) network created by the source device by entering a given password, wherein the mediator device checks client number and approves the client communication device joining the network.

18. The communication system of claim 1 wherein the source communication device communicates with client communication devices via the mediator device, by applying the following steps: the source communication device Start sending Packets in UDP format, the mediator device accepts packets in memory and multicast the packets in UDP using the WIFI network, wherein on the client side the packets are accepted and the content is presented to the client communication device.

\* \* \* \* \*